(12) United States Patent　(10) Patent No.: US 6,227,443 B1
Minato　(45) Date of Patent: May 8, 2001

(54) ENVELOPE WITH A DESIGNATED RETURN ENVELOPE PORTION

(76) Inventor: Masanori Minato, 6-26, Wakakusa, 3-chome, Utsunomiya-shi, Tochigi-ken, 320-0027 (JP)

( * ) Notice: Subject to any disclaimer, the term of this patent is extended or adjusted under 35 U.S.C. 154(b) by 0 days.

(21) Appl. No.: 09/398,022

(22) Filed: Sep. 17, 1999

(30) Foreign Application Priority Data

Aug. 18, 1999　(JP) ................................................. 11-232020

(51) Int. Cl.[7] .................................................. B65D 27/06
(52) U.S. Cl. ............................................................ 229/305
(58) Field of Search ................................ 229/305, 301, 229/313

(56) References Cited

U.S. PATENT DOCUMENTS

| | | | | |
|---|---|---|---|---|
| 4,190,162 | * | 2/1980 | Buescher | 229/305 X |
| 4,334,618 | * | 6/1982 | Buescher | 229/305 X |
| 4,632,427 | * | 12/1986 | Angus | 229/305 X |
| 4,815,654 | * | 3/1989 | Buescher | 229/305 |
| 5,169,061 | * | 12/1992 | Buescher | 229/305 |
| 5,285,958 | * | 2/1994 | Buescher | 229/305 |

FOREIGN PATENT DOCUMENTS

| | | | | |
|---|---|---|---|---|
| 2 409 920 | * | 7/1979 | (FR) | 229/301 |
| 7-315389 | | 12/1995 | (JP) . | |
| 10-250744 | | 9/1998 | (JP) . | |

* cited by examiner

*Primary Examiner*—Jes F. Pascua
(74) *Attorney, Agent, or Firm*—Armstrong, Westerman, Hattori, McLeland & Naughton,LLP

(57) ABSTRACT

An improved envelope is disclosed that is provided with a portion designated so as to be reusable as a return or ordinary envelope by a recipient of the envelope mailed. The envelope comprising a front side and a rear side portion opposing to each other, and having a flap included in the front side and a bottom portion formed of the front and rear side portions and opposing to the flap is formed therein with a return envelope portion. The return envelope portion has a flap portion having its area defined with both a line of cut and a line of fold formed on a region of the front or rear side portion. The return envelope portion is defined with the line of fold and the bottom portion or an upper portion opposing thereto of the envelope.

9 Claims, 15 Drawing Sheets

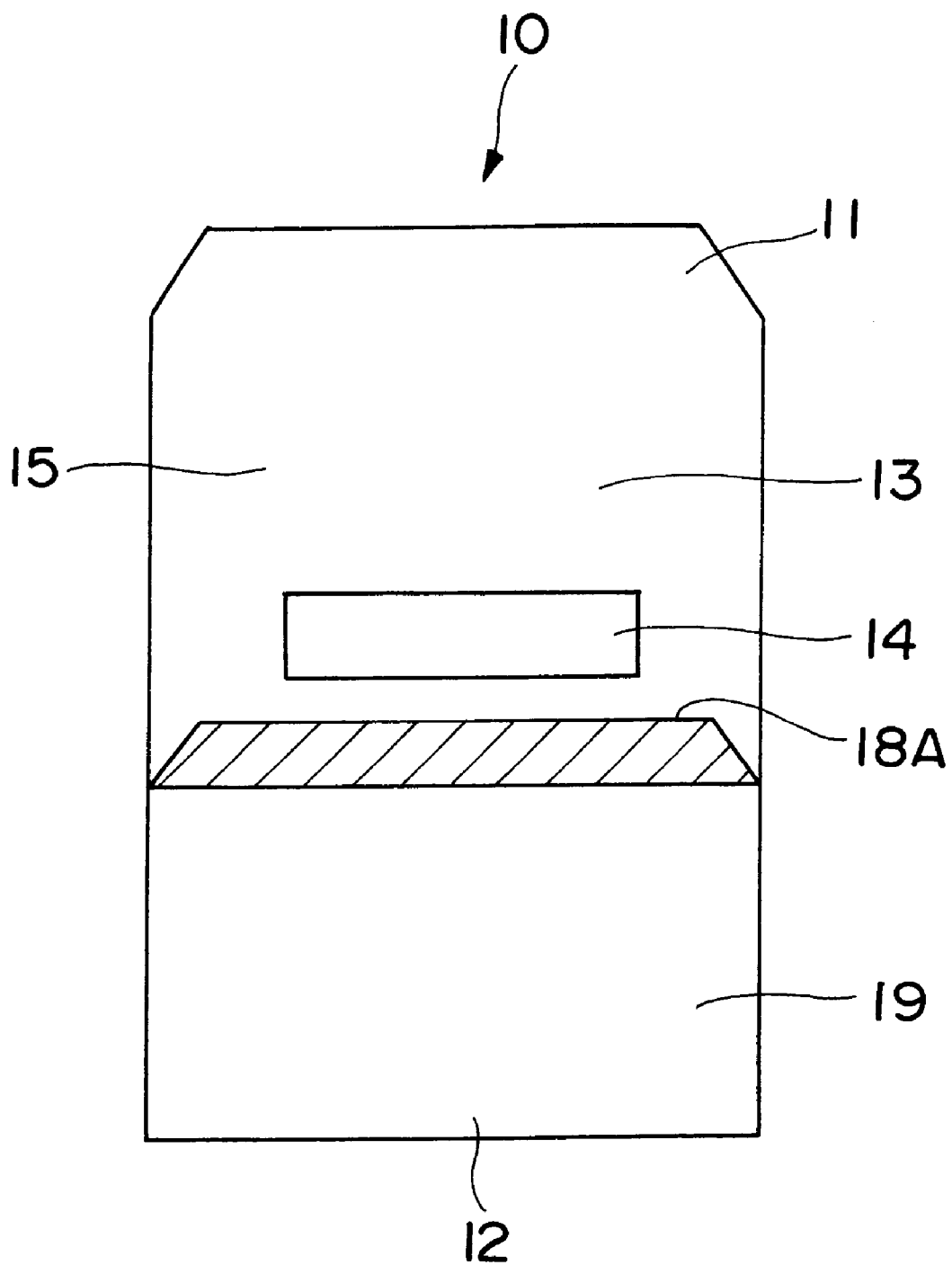

ENVELOPE WITH A DESIGNATED RETURN ENVELOPE PORTION

BACKGROUND OF THE INVENTION

1. Field of the Invention

The present invention relates in general to an envelope suitable for use in prompting or encouraging a reply or response to any variation of papers, documents, letters, survery papers, questionnaires, etc., including a postal request, application or subscription to an offer of the sale of goods.

More specifically, the invention relates to an improvement in an envelope of the type described and, in particular, an improved envelope having a reusable, return envelope portion adapted to enclose an enclosure such as a reply, response, request, application, subscription, order or the like, including a goods or commodity purchase order. The present invention also relates to an improved envelope having an envelope portion that facilitates sealing an enclosure therein when the envelope is reused.

2. Description of the Related Art

In mailing, for example, merchandise information from a company to a potential customer, or a questionnaire from a public service agency to an individual home, a rectangular shaped envelope is commonly used. Such envelopes have many sizes and various configurations that can be chosen to meet with those of the papers to be enclosed and mailed.

These envelopes once used are commonly discarded, however, without being reused. Also, in mailing back a purchase order based on the merchandise information, or the questionnaire or survey paper filled in, a separate envelope will have to be prepared and separately addressed. The conventional envelope is therefore inconvenient.

SUMMARY OF THE INVENTION

It is accordingly an object of the present invention to provide an improvement in envelopes that can remove the inconvenience of conventional envelopes.

Another object of the present invention is to provide an improved envelope that has a return envelope portion which permits the envelope mailed to be reused.

Another object of the present invention is to provide an improved envelope having a return envelope portion that may make a mail recipient or return sender unnecessary to write a return address on a return envelope.

A further object of the present invention is to provide an improved envelope having a return envelope portion which facilitates or simplifies sealing an envelope in reuse and is capable of curbing the risk of its contents coming in contact with other papers en route.

These and other objects which will become more readily apparent hereinafter are attained in accordance with the present invention in a first aspect thereof or in a first form of implementation thereof by providing, in an envelope comprising a front and a rear side portion opposing each other, and having a flap included in the front side portion, and a bottom portion formed of the front and rear side portions and opposing the flap, an improvement having a return envelope portion made integral therewith. The return envelope portion is provided with a flap portion that is defined with both a line of cutoff on which the return envelope portion can be cut off and detached and a line of fold, including a stamping or embossing made streak of fold, on which the flap portion can be folded. In both, such a line of cut and a line of fold are imparted to the envelope (main envelope) on a region of one of the said front and rear side portions thereof. The return envelope portion when the said flap portion is folded is thus defined on its one side with the said line of fold and is also defined on its other side with one of the said bottom portion and upper portion opposing to the said bottom portion of the envelope.

The return envelope portion can therefore be made detachable from the main envelope to provide a usable return envelope.

Advantageously, the return envelope portion can be configured in the form of a customary rectangular envelope with one side thereof constituted with the said bottom portion of the envelope.

An improved envelope having a return envelope portion can still be provided without having one of the said line of cutoff or the said line of fold on the envelope.

It will be desirable that the said flap portion be constituted by a pseudo flap portion having a pattern, a figure or a design printed thereon.

An improvement in an envelope or an improved envelope with a return flap portion according to the first aspect or form of implementation of the present invention as described above has therefore a return envelope predecessor preliminarily provided in the envelope in the bottom or upper portion thereof, using this bottom or upper portion of the envelope in common to the return envelope. A recipient of the envelope can thus simply detach the return envelope portion from the envelope mailed to his/her. For mailing out a purchase order for goods or commodity based on the offered merchandise information mailed in or returning a survey paper or questionnaire so received and filled in, or doing a similar response action, the recipient has no need to prepare an envelope anew and can simply use and address on the detached envelope portion now as a fresh envelope and send it out. In this case, the sender may very well care to have the return envelope portion self-addressed to eliminate the need for the recipient to address the return envelope on his/her its own. The present invention described above, therefore, facilitates and simplifies a return mailing action, and permits a portion of the received envelope to be effectively reused or recycled.

The present invention also provides in a second aspect thereof or in a second form of implementation thereof in an envelope having a body portion in the form of a bag and a flap provided to extend from said body portion, an improvement having a return envelope portion. The return envelope is formed in the said envelope body portion so that at least one of a bottom portion opposite to the said flap and an upper portion of the said envelope body portion may constitute a corresponding portion of the return envelope. The return envelope includes a return envelope body portion in the form of a bag adapted to contain material such as a paper or document, and a flap portion that is defined with a line of cutoff and a line of fold (including a stamping made streak of fold) which are imparted to a portion of the envelope in which the said flap portion is to be provided. The said return envelope body portion has a rear surface coming into contact with the rear surface of the said flap portion when the latter is folded. One of these rear surfaces has an adhesive applied thereto and also a peelable tab of paper applied thereto so as to cover the said adhesive on the said one rear surface, the said adhesive thus permitting the said flap portion to be bonded to the said return envelope body portion on peeling the said peelable tab of paper and folding the said flap portion onto the said return envelope body portion.

The said one rear surface onto which the said adhesive and the said peelable tab of paper are applied is the rear surface of the said return envelope body portion that comes into contact with the said flap portion when the latter is folded. In this case, the said peelable tab of paper covers the entire surface of the said adhesive and will at opposite sides thereof be bonded to said return envelope body portion.

Alternatively, the said one rear surface will be a rear surface of the said flap portion that comes into contact with the rear surface of the said return envelope body portion when the former is folded. In this case, the said peelable tab of paper covers the entire surface of the said adhesive and will, at opposite sides, thereof be bonded to the said flap portion.

A region of the said flap portion will be formed as being surrounded with both the said line of cutoff and the said line of fold.

Thus, an improvement in an envelope or an improved envelope of the present invention so implemented as mentioned above, here again, provides the recipient of an envelope with the availability of a return envelope that can be immediately prepared, that is outright available to the recipient by permitting the used envelope to be reused or recycled. Given the re-availability of the envelope mailed in and received from the sender to prepare a return envelope, the recipient can simply remove or detach the above mentioned return envelope portion from the envelope body portion by, e.g., scissoring, along the line of cutoff pre-imparted thereto, e.g., by printing. A portion of the removed or detached return envelope portion that lies on its rear side to extend or project from its one side in the same configuration as the flap portion on its front side with an opening between them is also removed or otherwise folded into the opening, thus inside the return envelope body portion.

In use of such a return envelope portion, now an equivalent to an envelope obtainable separately, on putting a reply paper into its body portion the flap portion on its front side is folded onto its rear side surface along it's borderline of fold pre-applied thereto to close the opening. And the peelable tab of paper that lies applied to cover the adhesive on one of the above mentioned rear surfaces of the return envelope body and flap portions can be peeled to expose the adhesive, thereby permitting the flap portion to be stuck onto the rear side of the body portion to seal the enclosed return envelope.

Accordingly, it is seen that not only does the present invention in this form of implementation as well, provides an effective reusability for an envelope, but it here eliminates the need for a return envelope when in use to be separately pasted, thereby facilitating sealing the return envelope. In addition, the possibility is avoided here for an envelope with a return envelope portion to stick to any other envelope or paper, yet ensuring an improved envelope's optimum usability and recyclability on site.

These and other features, objects and advantages will be understood and become more readily apparent to those of ordinary skill in the art from the following detailed description of the preferred embodiments as illustrated in the various drawing figures in the accompanying drawings.

BRIEF DESCRIPTION OF THE DRAWINGS

In the accompanying drawings:

FIG. 7 is a plan view diagrammatically illustrating a front side of an improved envelope with a return envelope portion according to a third modification of the first form of embodiment of the present invention;

DETAILED DESCRIPTION OF THE PREFERRED EMBODIMENT

Hereinafter, suitable embodiments as presently preferred of the present invention with respect to an improved envelope with a return envelope portion is set out with reference to the figures in the accompanying drawings hereof.

DESCRIPTION OF FIRST FORM OF EMBODIMENT

Figure 1:
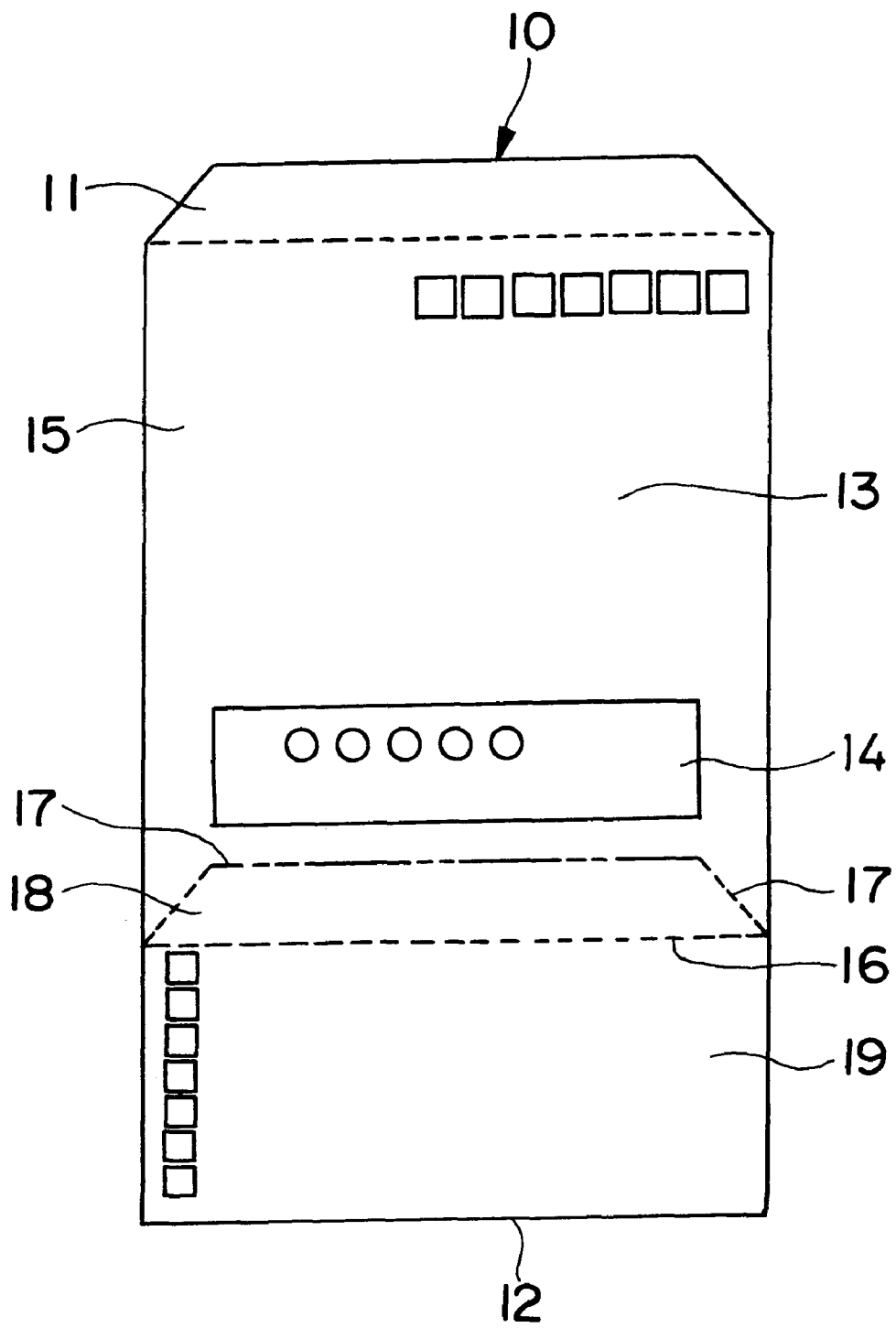
FIG. 1 is a plan view diagrammatically illustrating a front side of an improved envelope with a return envelope portion according to a first form of embodiment of the present invention.

In FIG. 1 there is shown the front side of an improved envelope 10 representing the first form of embodiment of the present invention. The envelope 10 shown includes a flap 11 and has a bottom portion 12. Also included in the envelope 10 are a blank space 13 in which the address of a recipient is to be entered by a sender and a sender identifying space 14 in which the name, address, telephone number and so forth of the sender may have been printed, the spaces 13 and 14 constituting an address region 15 of the envelope 10. The envelope 10, here made as a customary rectangular envelope of an opened end type, further includes a return envelope portion 19 that is made as an envelope of a side open type and formed adjacent to the address area 15 and in particular to the sender identifying space 14. The return envelope portion 19 has its bottom portion or closed side portion that is common to the bottom portion 12 of the envelope 10. The return envelope portion 19 includes its flap portion 18 that is defined with a line of fold 16 that may be a printed line or otherwise a streak made by stamping and with a line of cutoff 17 that may be a printed line.

Figure 2:
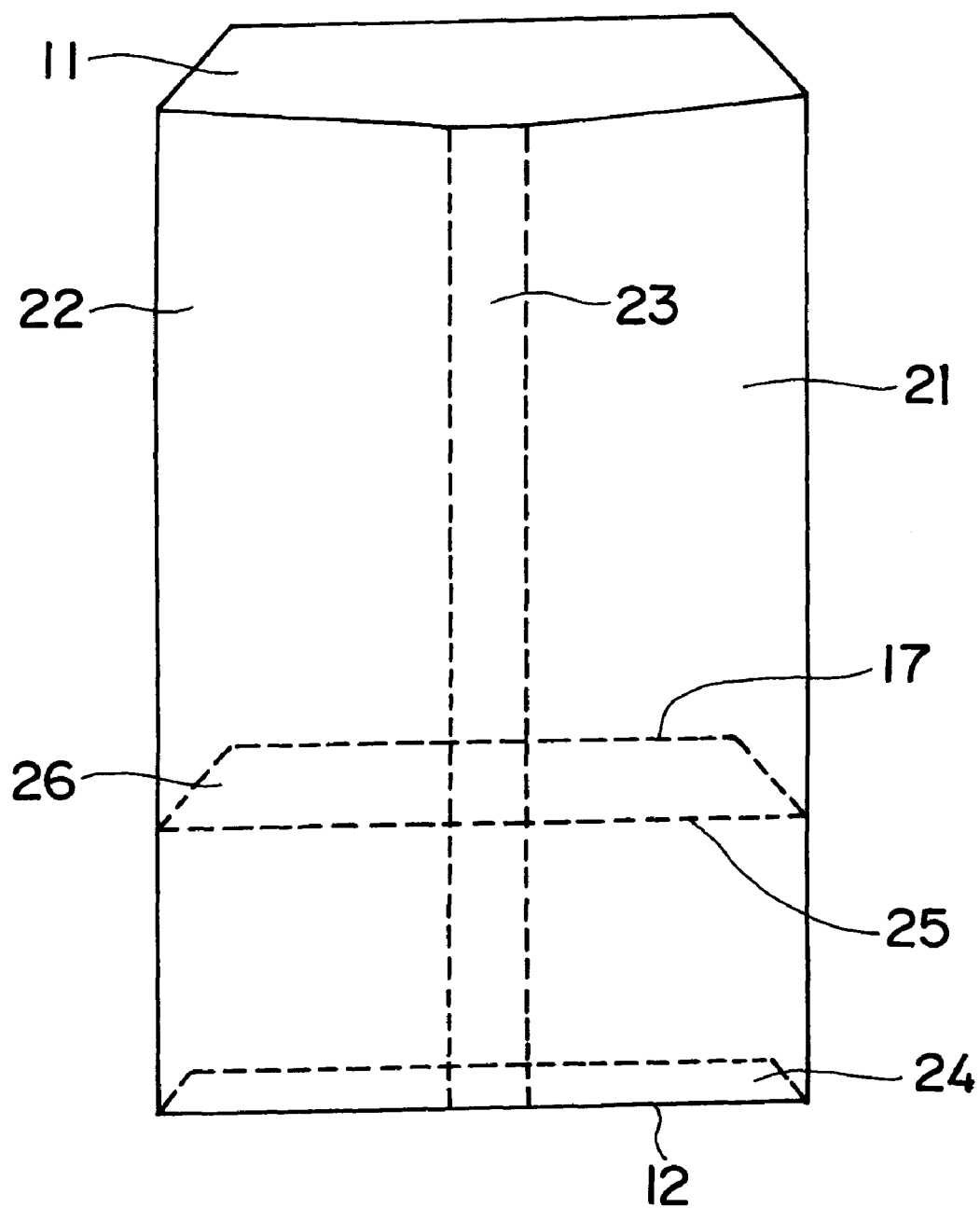
FIG. 2 is a plan view diagrammatically illustrating a rear side of the improved envelope with its return envelope portion according to the first form of embodiment of the present invention.

FIG. 2 shows the rear side of the envelope 10. It is seen that the sheet of paper forming the front side of the envelope 10 is folded on its opposite left and right hand sides, extending to form extensions 21 and 22 on the rear side of the envelope 10 as shown. The right and left hand side extensions 21 and 22 are pasted together in a pasting region 23 as shown. The rear side of the envelope 10 also includes a bottom extension 24 of the front side that is folded and pasted onto the rear side, thus forming the bottom portion 12. Also, a printed line or a stamping made streak of fold 25 corresponding to the line or stamping made streak of fold 16 on the front side is formed on the rear side of the envelope 10.

Thus, the recipient of the envelope 10 mailed in will, on unsealing the envelope 10, review a paper of information contained in it and if he/she wishes to mail back a reply or response, can remove the return envelope portion 19 from the envelope 10 by scissoring it along the printed line of cutoff 17. Then, removing the excess portion of projection 26 that remains on the rear side corresponding to the flap portion 18 on the front side provides a return envelope that is usable outright which may have either a regular or extra-regular size as commonly called in Japan. It should be noted that the excess portion of projection 26 instead of being cut off may be folded inside the return envelope portion 19 along the line or streak of fold 25.

Therefore, in mailing back a reply or response, e.g., a purchase order for goods based on the merchandise information offered or a survey paper or questionnaire filled out, it becomes unnecessary for one to prepare a return envelope or envelope afresh. One may simply use the return envelope now furnished from the received envelope as an integral part of it and detached from it, and may just address and mail out that envelope. Even the need to address may be eliminated as it is very well possible that the sender may have had the return envelope portion 19 self-addressed.

Description of First Modification of the First Form of Embodiment

Figure 3:
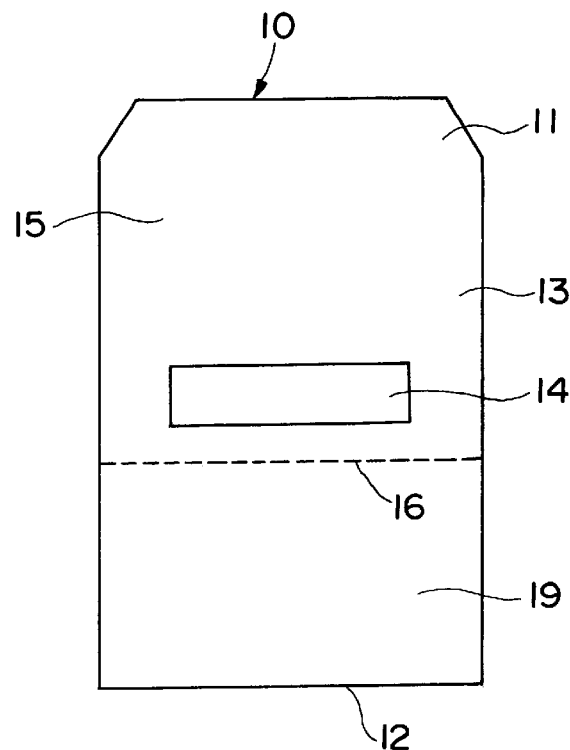
FIG. 3 is a plan view diagrammatically illustrating a front side of an improved envelope with a return envelope portion according to a first modification of the first form of embodiment of the present invention.

While the envelope 10 shown in FIGS. 1 and 2 had a line of cutoff 17 and a line of fold 16 made by, e,g., by printing thereon, in accordance with one modification of the first form of embodiment of the present invention an improved envelope 10 with a return envelope portion 19 is provided without having either the line of cutoff 17 or the line of fold 16 previously described, as shown in FIG. 3.

Thus, the user of a return envelope portion 19 in an envelope 10 which is devoid of a line of cutoff may cut off the return envelope portion 19 by scissoring the envelope 10 so that the return envelop portion cut off may include a region of the flap portion 18 shown in FIG. 1.

Alternatively, although not shown an improved envelope 10 according to this modification of the first form of embodiment of the present invention is provided to provide therein a return envelope portion 19 while eliminating a printed line of fold or a stamping made streak of fold 16 in the body portion of the envelope 10.

Even such a modification according to the present invention can be seen to offer advantages as discussed in connection with the first mentioned form of embodiment thereof, and of importance permits a used envelope 10 to be reused or recycled effectively.

An improved envelope 10 according to this modification of the first form of embodiment of the present invention as shown in FIG. 3 also offers an additional advantage in use if it is prepared with an address and so forth not pre-printed. This provides the sender with an option of choosing either the bottom portion 12 side or the upper side in which the flap 11 is provided, of the envelop 10 to the line of fold 16 for addressing.

Description of Second Modification of the First Form of Embodiment

Figure 4:
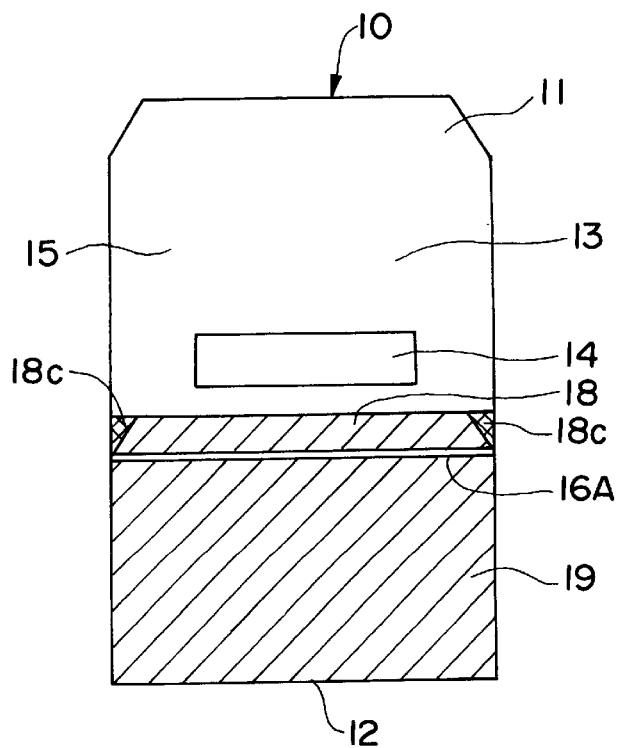
FIGS. 4 through 6 each are a plan view diagrammatically illustrating a front rear side of the improved envelope with its return envelope portion according to the second modification of the first form of embodiment of the present invention.

Referring now to FIG. 4 there is shown an improved envelope 10 with a return envelope portion according to a second modification of the first form of embodiment of the present invention. This modified envelope 10 shown in FIG. 4 has its bottom portion 12 provided with a return envelope portion 19 that is printed with a color which is different from the color with which the envelope 10 is printed where there lies an address area as previously mentioned.

In this modification, the printed line of fold 16 as previously described is not used and in lieu thereof a line of fold 16A is shown as being formed by a region of the return envelope portion 19 in the form of a stripe that is on the front side of the envelope 10 but on the rear side of the return envelope 19 which region remains unprinted. This region of stripe 16A that remains unprinted into the color of the return envelope 19 is so formed in a color that is the same as or different from the color of the envelope 10 in which a paper or the like is to be contained. Also, top corner areas 18c which become an excess in forming a flap portion 18 and which will have to be cut off (these areas 18c may hereinafter be referred to as cutoff areas) are printed with a color that is different from a color of the flap portion 18.

The user or the recipient of the envelope 10 may remove the return envelope portion 19 from the envelope 10 by incising, e.g., scissoring, along the borderline between the two different colors bordering the return envelope portion 19 and the address portion 15. Then, an incision is made, e.g., by scissoring, along the borderlines between the flap portion 18 and the excess portions 18c. A return envelope is thus provided from the envelope 10, and from the return envelope portion 19.

It is therefore seen that an improved envelope according to this modification offers advantages as gained by an improved envelope according to the first form of the invention previously described, and of importance, permits an envelope to be reused or recycled.

Figure 5:
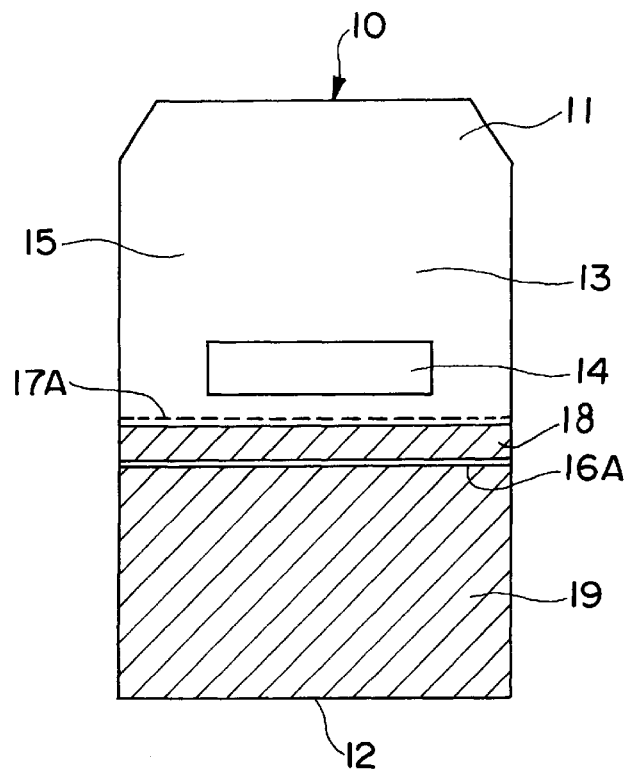

The cutoff portions 18c and the flap portion 18 may be printed in the same color so that they may not be demarcated from each other to provide an improved envelope 10 shown in FIG. 5.

Figure 6:
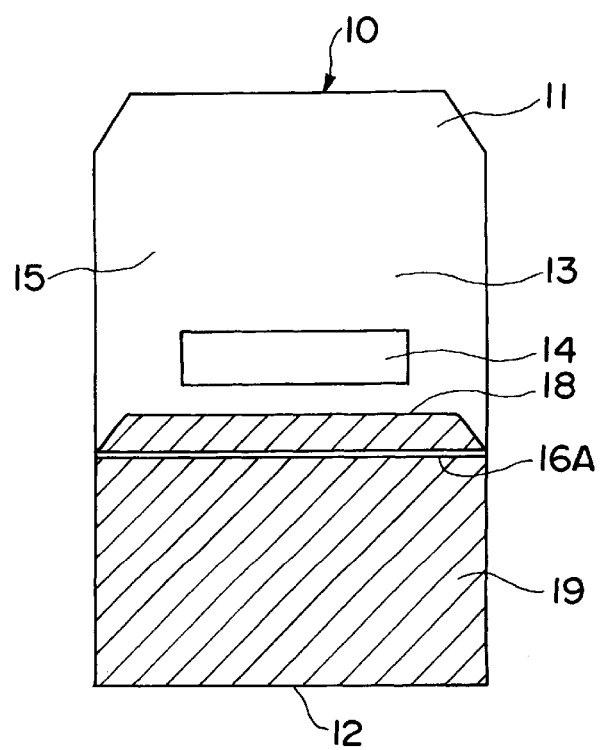

Also, as shown in FIG. 6, an improved envelope 10 can be formed without being printed the cutoff portions 18c.

An improved envelope may also be formed by printing a line of cut 17A along the borderline between the envelope return envelope portion 19 and the address region 15, i.e., on the borderline between the different colors in the improved envelope shown in FIG. 5. It should be noted that such a printed line of cut 17A may be imparted to the improved envelopes shown in FIGS. 4 and 6.

It should further be noted that the concept of imparting different colors to various portions of the return envelope portion 19 or the envelope 10 may be applied as well to the improved envelopes according to the first form of embodiment of the invention and the first modification thereof shown and described in connection with FIGS. 1 to 3. Thus, for example, the flap portion 18 and the body portion of the return envelope 19 in which a reply paper is contained may be printed in a color that is different from a color in which the remainder of any of those envelopes 10 where the address area 15 is provided is printed.

Also, the line of fold 16A may alternatively be formed to achieve its role by printing that straight line in a color that is darker or lighter than the color of the return envelope flap portion 18 or the body portion of the return envelope portion 19 in which a reply paper is received.

Suffice it to say that the improved envelope 10 is likewise provided having the part of the envelope 10 color-printed in which the address area 15 is provided.

It should further be noted that the improved envelopes 10 shown in FIGS. 4 to 6 may be provided with a designated area in which the address is to be entered. For instance, the return envelope portion 19 of any of those envelopes may have a given area as such an area on its front side that is printed in a same color as the part of the envelope 10 in which the address region 15 is provided so that this particular area may clearly be demarcated from the remainder of the return envelope portion.

Description of Third Modification of the First Form of Embodiment

Referring next to FIG. 7, there is shown an improved envelope 10 with a return envelope portion according to a third modification of the first form of embodiment of the present invention. This modified envelope 10 differs from the envelope shown in FIG. 1 in that instead of the flap portion 18 defined with the line of cut 17 and the line of fold 16 there is provided a pseudo flap portion 18A.

In this modified embodiment shown in FIG. 7, the pseudo flap portion 18A is printed with a pattern, figure, design etc., on the envelope 10 in which the flap portion 18 for the return envelope portion 19 is to be provided as in the FIG. 1 embodiment.

In use of the return envelope portion 19, the user or the recipient of the envelope 10 may, analogously to incising along the line of cut 17 in FIG. 1, incise, e.g., scissor the upper end portions of the trapezoidal pseudo flap portion 18A to remove from the envelope 10 the return envelope portion 19 that provides a return envelope.

It is therefore seen that an improved envelope according to this modification offers advantages as gained by an improved envelope according to the first form of the invention previously described, and of importance, permits an envelope to be reused or recycled.

It should be noted that while in FIG. 7 the pseudo flap portion 18A is shown as shaded with oblique line, it may alternatively be a pseudo flap printing shaded with mesh lines, or otherwise patterned or decorated to provide an improved envelope 10 according to this modification. Also, the pseudo flap portion 18A shown in FIG. 7 to be trapezoidal may be formed to be rectangular.

It is also possible to print the body portion of the return envelope portion 19 and the address region 15 other than the pseudo flap portion 18A and leave the pseudo flap portion 18A unprinted.

Description of Second Form of Embodiment

Referring now to FIG. 8, there is shown an improved reusable envelope with a return envelope portion, or an improved envelope with a reusable envelope portion that represents a second form of the present invention, which permits the one who received, opened the envelope, confirmed its contents and then intends to mail out a paper or correspondence to any addressee to use as an ordinary postal envelope a portion of the envelope received. Specifically, the recipient of the envelope may utilize and cut off a blank portion of it as such reusable envelope portion to make a smaller envelope available from the used envelope. The smaller envelope may then be used effectively in sending a document etc., to any addressee, or to the sender of the received envelope a reply or response paper such as a received document, survey paper or filled out questionnaire, or a purchase order for a commodity or goods to the sender.

The second form of embodiment of the present invention therefore provides an improved envelope with a designated reusable portion that can be used as a return envelope for being sent back to the sender of the envelope, or as an ordinary envelope for transmittal to any addressee, thus can widely be used for either purpose. Such a "reusable envelope" portion is referred to in the present specification as a "return envelope" portion for convenience' sake.

Accordingly, it should be noted that not only does an improved envelope according to this form of embodiment of the present invention as well provide an effective reusability for an envelope and eliminate the need for a separate envelope to be prepared anew, but it is designed to include a provision that facilitates sealing a return envelope or an envelope prepared from the return or reusable envelope portion, and permitting the optimum use of such a return or reusable envelope portion from a received improved envelope. Effective utilization of paper resources is thus achievable also.

Figure 8A:
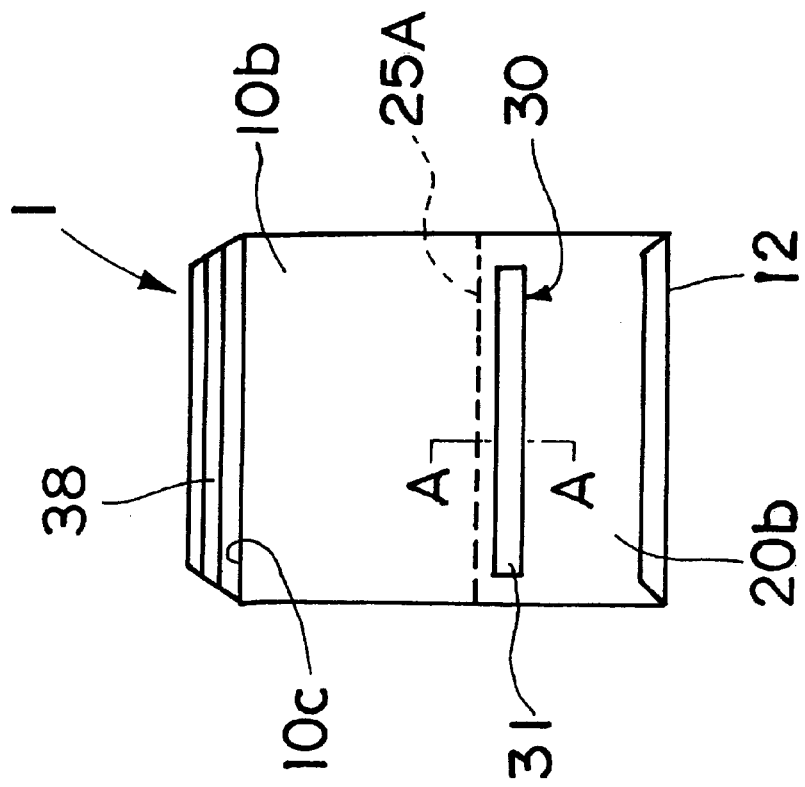
FIG. 8A is a front view diagrammatically illustrating an improved envelope according to a second form of embodiment of the present invention.
Figure 8B:
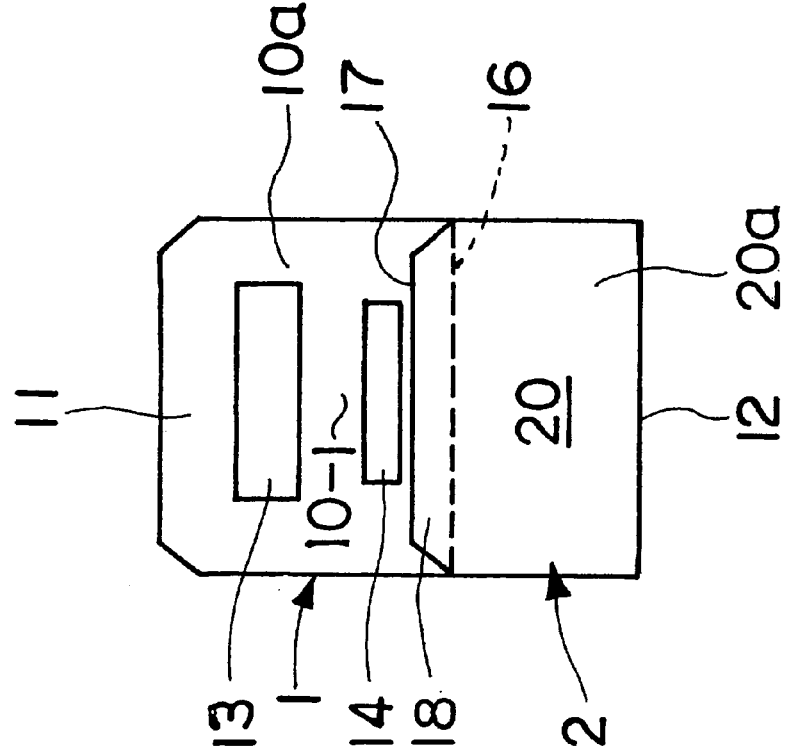
FIG. 8B is a rear side view diagrammatically illustrating an improved envelope according to a second form of embodiment of the present invention.

As shown in FIGS. 8A and 8B, an improved envelope 1 according to the present invention includes a top open body portion 10-1 in the form of bag formed by a front and a rear side 10a and 10b opposing to each other, and a top opening 10c formed at their upper ends. Contents of the envelope 1 in the form of a paper or papers, etc., are put in through the top opening 10c in the usual manner. The envelope body portion 10-1 has a bottom portion 12 located at the end opposite to the top opening 10c, and is provided with a flap 11 that is made integral with the body portion 10-1 so as to project upwards from the top opening 10c of the envelope's front side 10a. The improved envelope 1 further comprises a return envelope portion 2 in a region of the envelope body portion 10-1 that includes the envelope's bottom portion 12 and extends from it upwards.

A region of the envelope body portion 10-1 that is other than the return envelope portion 2 is provided on its front side and in the embodiment shown upwards of the return envelope portion 2 with both a blank space 13 where the name and address of a recipient is to be entered by printing or handwriting and a sender identifying space 14 in which the name, address, telephone number and so forth may be or may have been printed. One or both of these spaces may be enclosed with a printed rectangle or rectangles.

The flap 11 that is made integral with the front side 10a of the body portion 10-1 that extends upward from the top opening 10c of the body portion 10-1 is foldable onto the rear side 10b to close the opening 10c and to seal the envelope 1. Preferably, a layer of paste 38 is pre-applied to the rear side surface of the flap 11 to permit the flap 11 folded, to stick to a surface of the rear side 10b of the body portion 10-1 and thereby allow the envelope 1 to be sealed with readiness.

The return envelope portion 2 in the body portion 10-1 of the envelope 1 is defined with a body portion 20 for accepting contents such as a paper and with a flap portion 18.

The flap portion 18 has a region made continuous with the front side 20a of the return envelope 20 and defined to extend upwards. In specific terms, such a flap portion 18 region as shown in FIG. 8A is defined with a fold 16 that represents its borderline with the body portion 20 for folding the flap portion 18 onto the rear side 20b. The flap portion 18 region is also defined with a line of cuts 17 that represent its borderline with the envelope body portion 10-1 for removing the return envelope portion 20 from the envelope body portion 10-1.

The fold or line of fold 16 is formed by stamping during manufacture of the envelope as will be later described in detail to ease folding from the front side 10a onto the rear side 10b and is formed on the body portion front side 10a. The line of cut 17 is formed or printed in a solid line on the body portion front side 10a upwards of the fold or line of fold 16 with a given distance therefrom trapezoidally. As shown in FIG. 8B, the return envelope portion 2 according to the second form of embodiment of the invention is further provided on the rear side 10b of the body portion 10-1 with a fold or line of fold 25A that is analogous to the fold or line of fold 16. The fold 25A is formed by stamping simultaneously when the fold 16 is formed during manufacture of the envelope. The fold 25A is formed on the rear side 10b of the body portion 10-1 to ease folding into the opening of the return envelope portion 20 a portion in the form of a tab of paper that is left above the fold 25A when the return envelope portion 2 is removed from the envelope 1.

Further, an adhesive portion 30 is provided below the fold 25A on the rear side 10b of the body portion 10-1 as shown in FIG. 8B. The adhesive portion 30 is provided to serve, in use of the return envelope portion 2, to bond the flap portion 18 to a surface of the rear side 20b of the return envelope portion 2. The adhesive portion 30 comprises a peelable tab of paper 31 and an adhesive layer 32, and is designed to prevent the adhesive 32 while on the surface of the rear side 20b of the return envelope 2 from causing sticking with any other mail. Thus, as shown in FIG. 9, the adhesive layer 32 is applied on that surface of the rear side 20b of the return envelope 2 and the peelable tab of paper 31 is applied thereto so as to cover the entire surface of the adhesive layer 32.

Figure 9:
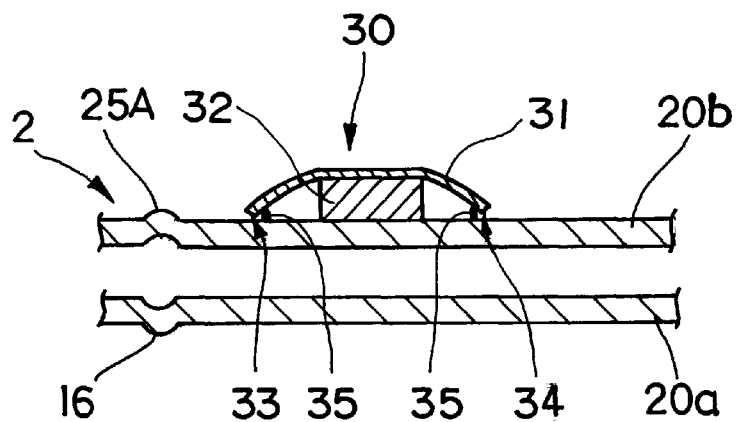
FIG. 9 is a diagrammatic cross sectional view of the improved envelope taken along line A—A as viewed in the direction of the arrows in FIG. 8B.

As shown in FIG. 9, so that the adhesive layer 32 may not protrude outside the layer of adhesive 32 is wholly covered with the peelable tab of paper 31 that is larger in width than the adhesive layer. Portions of the peelable tab of paper 31, including its side rim portions, which are not in contact with the adhesive layer 32 are prevented from turning up by bonding such rim portions, e.g., upper and lower side rim portions 33 and 34, of the peelable tab of paper 31 to the rear side 20b surface lines or stripes of adhesive 35 and 35. This arrangement is shown to prevent the peelable tab of paper 31 when caught by any other envelope or obstacle from peeling undesirably.

Figure 10:
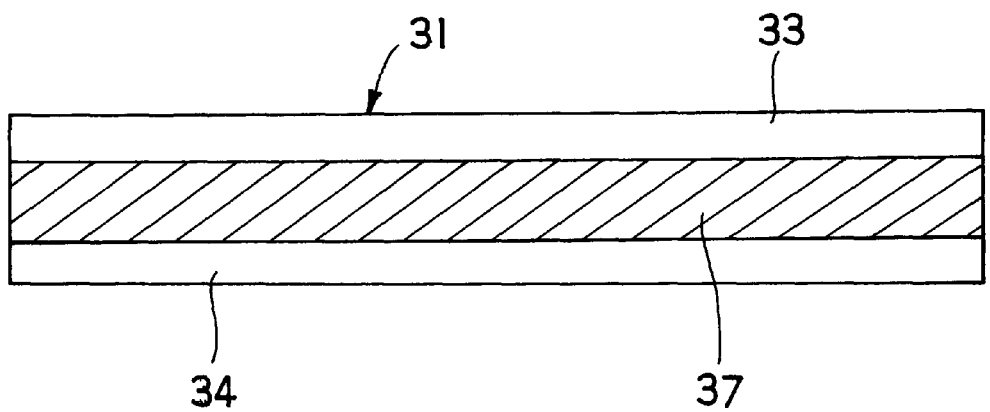
FIG. 10 is a plan view diagrammatically illustrating a peelable tab of paper for use in an improved envelope according to the second form of embodiment of the present invention.

In the embodiment shown, the peelable tab of paper 31 as can be seen in FIG. 10 has a layer of silicone resin 37 applied thereto in an area shaded with oblique lines that comes in contact with the adhesive layer 32 so that the adhesive layer 32 may be coated with a silicone resin applied area 37 and the remaining areas of the peelable tab of paper including its upper and lower side rim portions 33 and 34 may be pasted to the rear side 20b surface with the adhesive stripes 35. This arrangement prevents the peelable tab of paper 31 from becoming permanently stuck to the adhesive layer 32, and holds it 31 in place while leaving it peelable by fingers from the return envelope body portion 20. In the use of the return envelope portion 2, such finger action permits the tab of paper 31 stuck at its side rim portions 33 and 34 with the adhesive 35 to the rear side 20b surface to be peeled from the body portion 20 to expose the adhesive layer 32. Then, the flap portion 18 is folded to bring its rear surface into contact with the exposed adhesive layer 32 on that rear side surface and is thereby bonded thereto to complete the sealing of the return envelope.

In mailing out a paper using the envelope 1 so constructed as described above, the sender may insert the paper through the top opening 10c of the envelope 1 into the inside of the body portion 10-1 and paste the flap 11 onto the rear side 10b of the body portion 10-1 to seal the envelope 10. The sealed envelope may be addressed and posted to the recipient.

The recipient may unseal the mailed-in envelope 1 and after taking out the paper may prepare a return envelope from the once-used envelope 1 following the procedures described below.

The envelope 1 is scissored or otherwise cut along the trapezoidal line of cut 17 to remove the return envelope portion 2 from the envelope body portion 10-1. The removed return envelope portion 2 will then have a flap portion 18 projecting upwards from the return envelope body portion 20 on its front side 20a and also an excess portion that projects upwards from the body portion 20 on its rear side 20b in the same configuration on the front side 20a. This excess portion on the rear side 20b is folded on the line of fold 25A into the inside of the body portion 20. Performing these actions alone produces a usable return envelope that is recycled from the used envelope 1.

The above mentioned excess portion on the rear side 20b. The portion that remains on the rear side 20b and projects upwards in the same configuration as the flap portion 18 on the front side 20a may, instead of being folded into the inside of the body portion 20, be cut off by scissoring or otherwise cutting along the line of fold 25A bordering this portion and the body portion 20 on its rear side 20b.

In order to mail out a paper using the return envelope so prepared from the used envelope 1, one may after inserting the paper into the inside of the body portion 20 peel the tab of paper 31 in the adhesive portion 30 to expose the adhesive layer 32. Then, the flap portion 18 projecting on the front side 20a is folded onto the rear side 20b of the return envelope body portion 20 and bonded to the exposed adhesive layer 32 and thus to the return envelope body portion 20 have the return envelope sealed. The sealed return envelope on the front side 20a the destination and if necessary the sender as well, may be posted.

Mention is next made of a method of making improved envelopes according to the second form of embodiment of the invention described.

Figure 11:
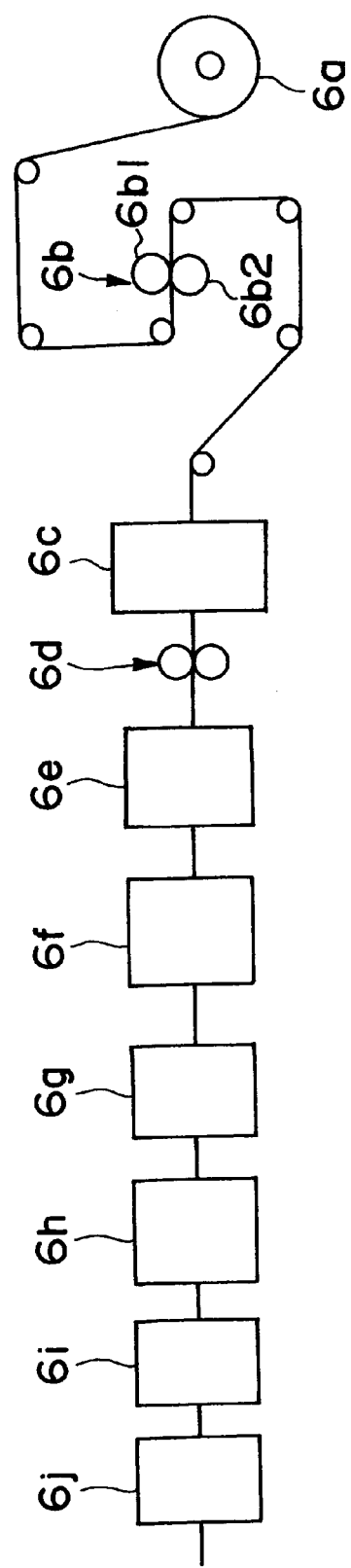
FIG. 11 is a block diagram for the purpose of explaining a manufacturing process for an improved envelope according to the second form of embodiment of the present invention.
Figure 12:
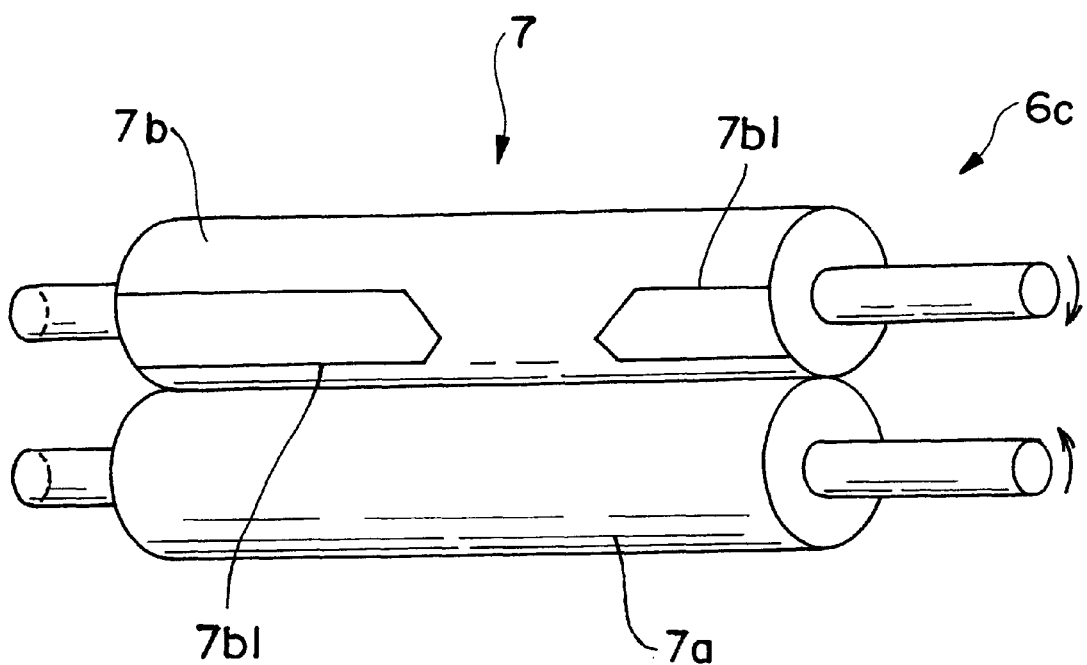
FIG. 12 is a diagrammatic, essentially perspective view for the purposes of explaining a process step for forming incisions in a paper material making up the envelope to remove excess portions in the envelope manufacturing process shown in FIG. 11.

Referring to FIG. 11, a continuous web or sheet of paper making up an envelope is unrolled from a roll 6a and is passed through a printing stage or machine 6b where a block designating the space for the postal code to be entered, lines of fold 16 and 25A, a line of cut 17 and if appropriate the recipient's name and address are printed on the sheet of paper at its given sites. Shown in FIG. 11 as indicated by reference characters 6b1 and 6b2 are a printing and a pressure cylinder, respectively, which constitute principal components of the printing machine 6b.

Figure 13:
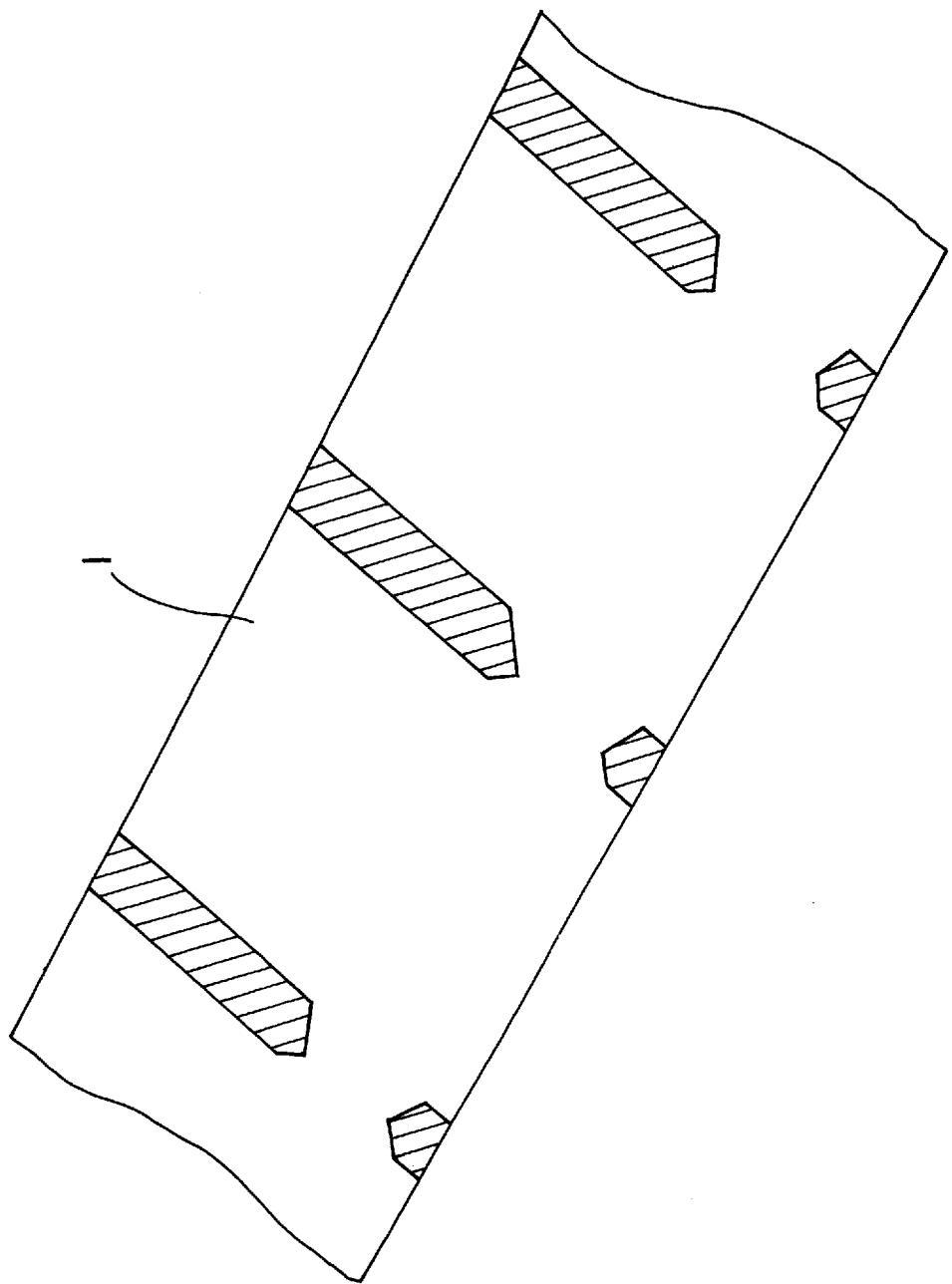
FIG. 13 is another diagrammatic view for the purposes of explaining a process step for forming incisions in an envelope makeup paper material to remove excess portions in the envelope manufacturing process shown in FIG. 11.

The printed sheet of paper is then incised in a first incising stage 6c along the outlines of excess areas or those areas of paper that are discarded in making the envelopes. For example, the incising stage 6c may make use of a roller section 7 that includes a first and a second roller 7a and 7b. The second roller 7b is provided with an incising edge 7b1 formed in a configuration corresponding to the outlines of those excess areas to incise the sheet of paper drawn into between the first and second rollers 7a and 7b while the paper sheet is being pressed against the second roller 7b by the first roller 7a. The discardable areas as shown by the shaded areas in FIG. 13 are thus cut off.

Figure 14A:
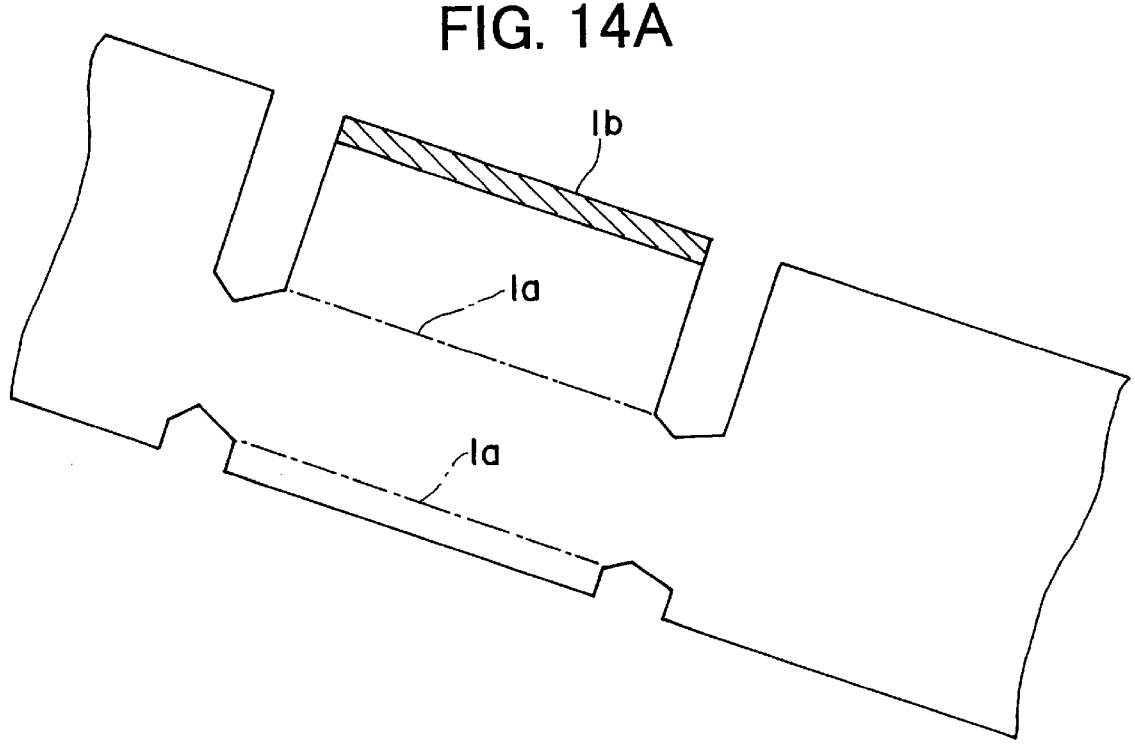
FIG. 14A is a diagrammatic view for the purposes for explaining a typical example of the process step for applying a line of fold to an envelope makeup paper material and FIG. 14B is a diagrammatic view of a mechanical arrangement for applying such a line of fold to the paper material, in the envelope manufacturing process shown in FIG. 11.
Figure 14B:
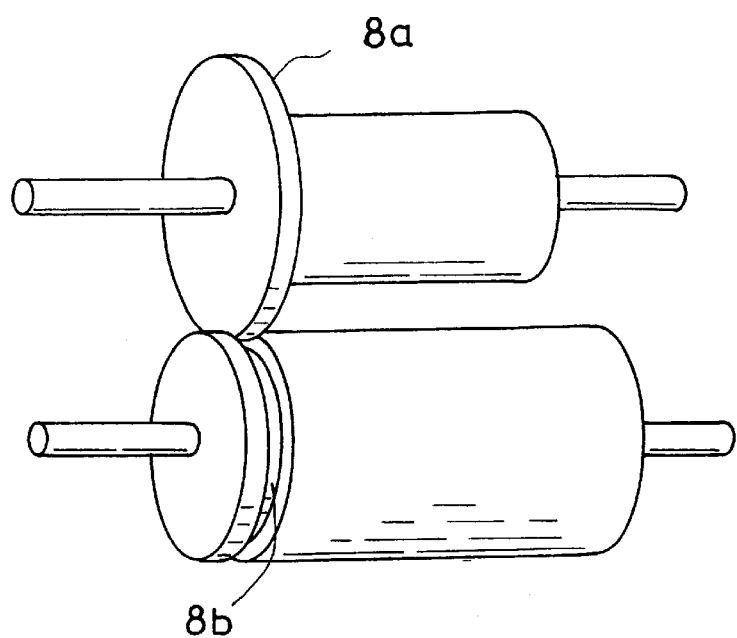

In a subsequent fold imparting stage, folds or lines of fold as shown at 1a by alternative long and short dash lines in FIG. 14A are imparted to the body of paper to permit an unfolded envelope paper portion to be folded on these lines 1a. The folds 1a are imparted to the paper portion, for example, by passing the sheet of paper between a pair of rollers 8a and 8b as shown in FIG. 14B which are rotated in opposite directions in a pressure contacting relationship with each other. The folds 1a are thus produced in the form of grooves or streaks in the sheet of paper. It should be noted that the sheet of paper is introduced between the rollers 8a and 8b so that its side becoming the front side of the envelope abuts on the roller 8b.

Figure 15:
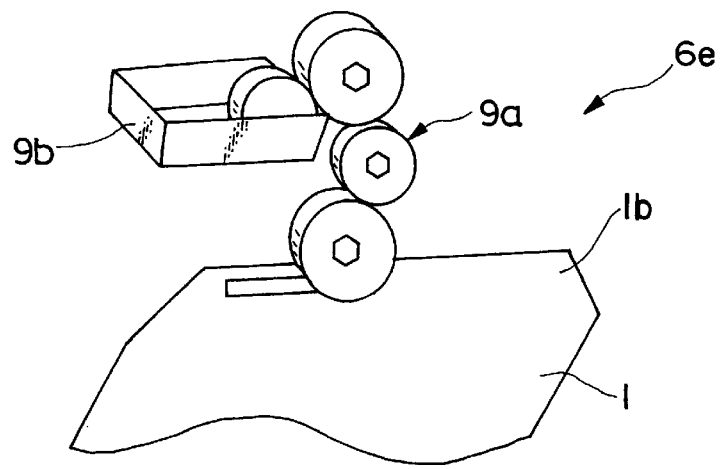
FIG. 15 is a diagrammatic, essentially perspective view diagrammatically illustrating an apparatus construction for pasting envelope makeup paper material in the envelope manufacturing process shown in FIG. 11.
Figure 16:
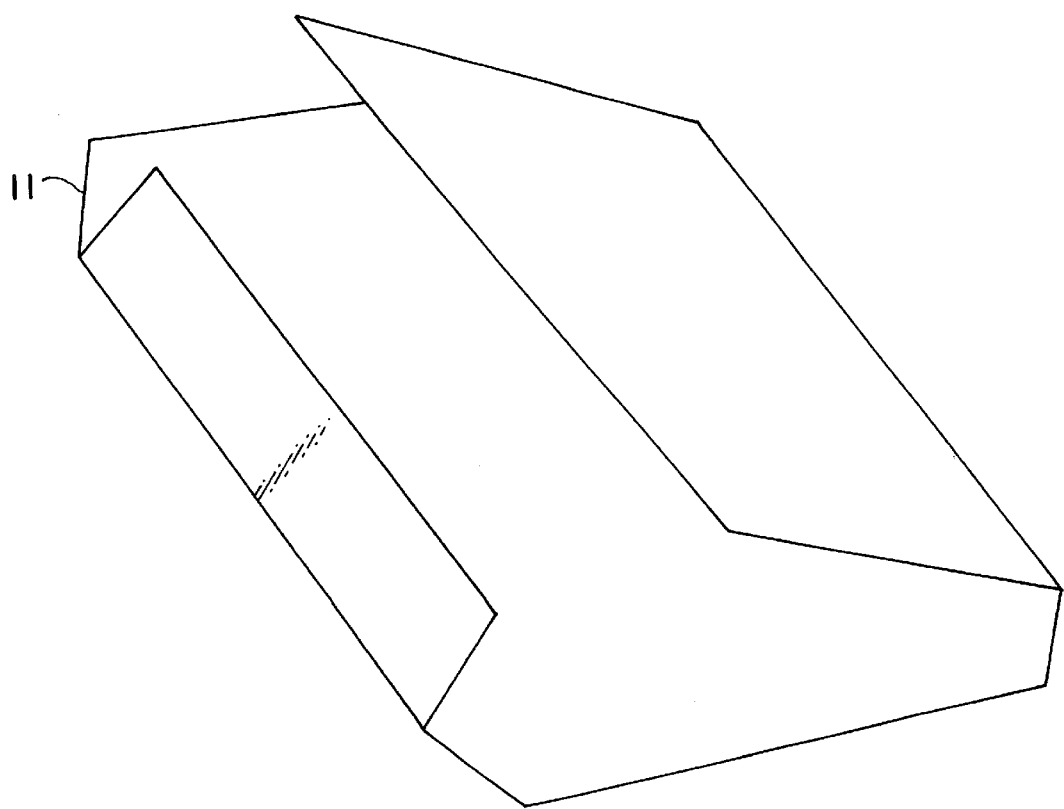
FIG. 16 is a diagrammatic, essentially perspective view for the purposes of explaining the process step for folding an unfolded envelope into a bag configuration in the envelope manufacturing process shown in FIG. 11.

Next in a gumming or pasting stage 6e, as shown in FIG. 15 a roller bearing assembly 9a (which is constituted with a plurality of rollers) transfers a paste stored in a paste reservoir 9b to apply the paste onto sticking tabs 1b shown in FIG. 14A by the area shaded with oblique lines.

In the next incising stage 6f, the sheet of paper is incised into a series of unfolded envelope units so that these units may thereafter be processed individually. Then, a folding stage 6g folds each unfolded envelope unit on the lines of fold 1a and with its side surfaces pasted together, a folded envelope unit issues in the form of a bag.

Subsequently, each issued envelope unit enters into process stages in which the adhesive portion 30 is formed on the rear side 10b of the envelope 1 as described below.

Figure 17:
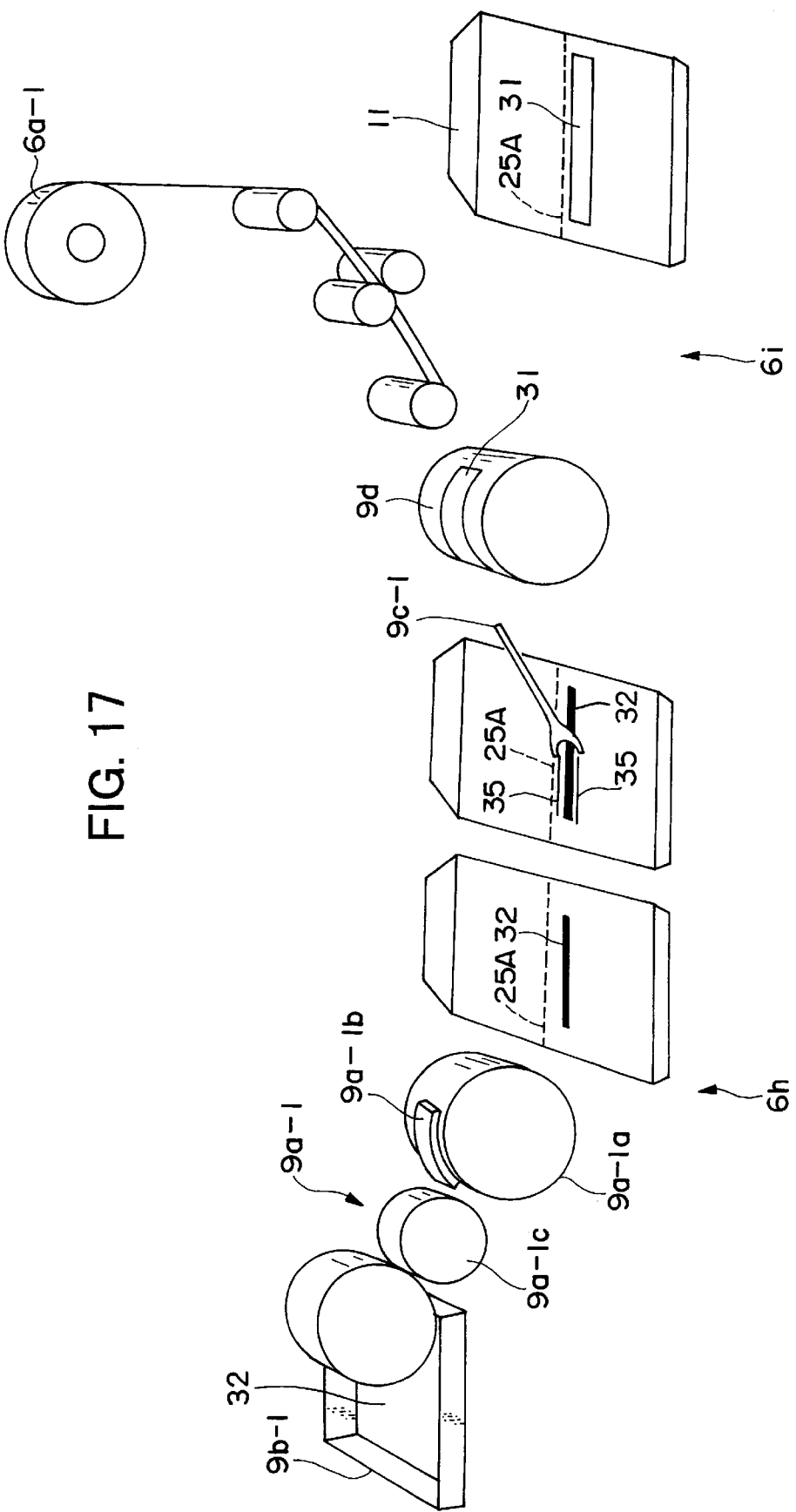
FIG. 17 is a diagrammatic view for the purposes of explaining the process step in the tape processing stage and the tape working stage.

In a tape processing step 6h which as shown in FIG. 17 uses a roller bearing assembly 9a-1 constituted with a plurality of rollers, an adhesive 32 is transferred from a reservoir 9b-1 through these rollers and applied onto a surface region on the rear side 20b which the flap portion 18 on the front side 20a when folded comes in contact with.

A roller 9a-1a in the roller bearing assembly 9a-1 is provided with a sponge 9a-1b that absorbs from a roller 9a-1c adhesive 32 being transferred from the adhesive reservoir 9b-1 to apply adhesive onto the envelope. A surface of the sponge 9a-1b that comes into contact with the envelope is formed to be an elongated surface area as shown by the area shaded with oblique lines in FIG. 10.

The tape processing stage 6h also includes a nozzle 9c-1 that is bifurcated at its end to provide a pair of nozzle outlets which are adapted to apply adhesive to the selected surface region on the envelope rear side 10b so as to form a pair of adhesive stripes 35 across the elongated adhesive layer 32 therein. These adhesive layers and stripes 32 and 35 may be either the same or different in adhesive composition. Although not shown, a tube is used to supply adhesive (35) into the nozzle 9c-1 from the reservoir.

Next in a tape working stage 6i, a peelable or detachable tab of paper 31 is attached to the selected surface region on the envelope rear side 10b so as to cover both the adhesive layer 32 and the adhesive stripes 35 therewith. A continuous sheet of paper forming peelable tabs of paper 31 and thus having a width of these tabs is unrolled from a roller 6a-1 and cut into pieces each of a length of the tab 31. Each of these pieces cut away is attracted onto a roller 9d by vacuum and the roller 9d being rotated attaches the piece of paper as a peelable tab of paper or tab of paper for detachment 31 onto the envelope 1.

The cylindrical surface of the roller 9d is formed, e.g., with channels or openings into which room air may be drawn to allow the tab of paper 31 cut away to be attracted onto the roller 9d.

Thereafter, a tab of paper forming the bottom portion 12 is pasted in a bottom pasting stage 6j using a plurality of rollers as in the pasting stage 6e. The bottom tab is then pasted onto the body portion 10-1 to complete making an improved envelope 1.

An improved envelope 1 made in this manner may be first used to mail to any recipient in a usual way. The recipient may then reuse the used envelope by cutting off and removing the return envelope portion 2 from the envelope body portion 10-1 to prepare a return envelope that is just as equivalent to a fresh envelope separately made available. In use of the return envelope portion 2, the recipient may insert a paper to be sent back or afresh, peel the tab of paper for detachment 31 from the return envelope portion 2 to expose and thus to activate the adhesive layer 32, and then fold the flap portion 18 onto the rear side 20b of the return envelope body portion 20 to seal the return envelope by permitting the flap portion 18 to be stuck thereto with the activated adhesive layer 32. The sealed return envelope on an entry as required on its front and possibly also on its rear side may be posted.

It is seen that the second form of embodiment of the present invention provides an improved envelope with a portion that is reusable as a return envelope or an ordinary envelope having a region to be stuck or fastened with paste. The reusable portion conveniently has adhesive or paste pre-applied to such a stickable or fastenable region, yet free of the possibility that the pre-pasted reusable portion of the improved envelope while in mail may stick to other envelopes to trouble the mailing process. This freedom is here assured by a peelable tab of paper uniquely in the improve envelope to be mailed out with the tab left applied.

Yet, for example, the possibility that such a tab of paper 31 may, in contact with another envelope, come off from a return or reusable envelope portion 2 removed from the envelope body portion 10-1 but still unsealed to expose an adhesive layer or paste 32 and permit the exposed adhesive region to stick to other paper is conveniently avoided by having the tab applied to the rear side surface area of the return or reusable envelope portion 2 in adhesive contact therewith. Optimum reusability of the envelope with a reusable portion is therefore assured.

Also, it is a matter of course that a return envelope portion 2 facilitates sealing and saves one trouble pasting.

Description of Other Modifications

While in the preceding description the adhesive portion 30 is shown as provided in an outer surface of the envelope 1 on the rear side 10b thereof, the adhesive portion 30 may alternatively be provided in an inner surface of the bag shaped envelope 1, namely on a back surface region of the front side thereof that becomes a rear surface of the flap portion 18 of a return envelope portion 2. According to this modified form of embodiment, pre-pasting a rear surface region of the flap portion 18 (on the back surface of the front side or the back surface of the rear side of the envelope, namely one of the two inner, opposing surfaces of the envelope interior for containing a paper) still avoids the inconvenience that adhesive may adhere to the paper and cause the paper when taken out by the recipient to become broken.

To wit, a peelable tab of paper 31 of the adhesive portion 30 as it inside the envelope 1 remains attached to its inner surface region to cover both the adhesive layer and stripes 32 and 35 until the envelope 1 is reused prevents adhesives 32 and 35 from adhering to a paper inside of the envelope 1, thus offering optimum usability of the return envelope portion 2 in reuse of the used envelope 1.

On the other hand, while in the same preceding description the return envelope portion 2 is shown to have the bottom portion 12 including its two corners in common use with the envelope 1, the return envelope portion 2 may alternatively be formed to have its body portion including one of the two corners in the bottom portion 12 in common use with the envelope 1.

Figure 18B:
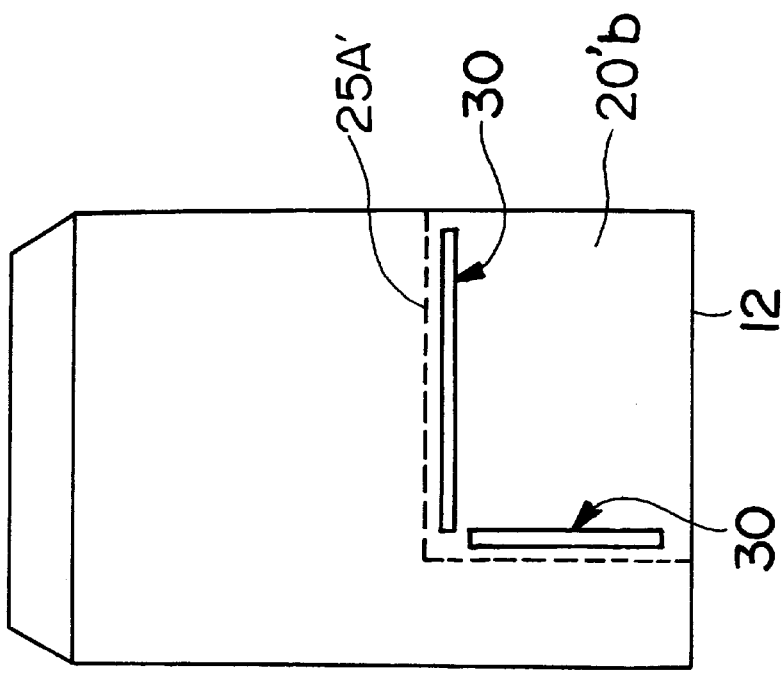
FIGS. 18A and 18B are a front and a rear side view, respectively, diagrammatically illustrating an envelope according to another form of embodiment of the present invention.
Figure 18A:
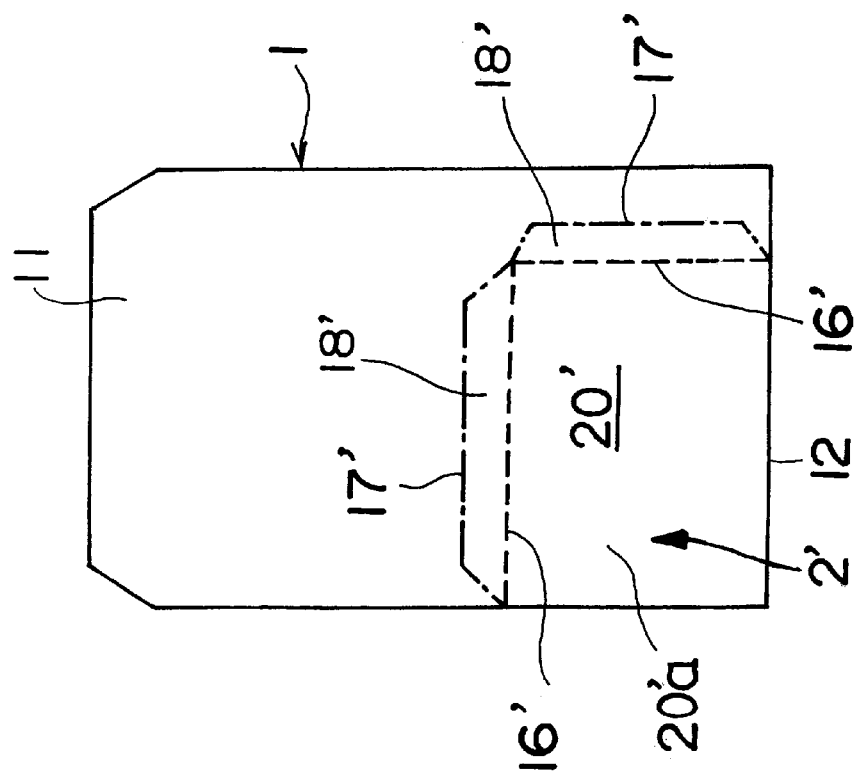

For instance, an improved envelope 1 according to the present invention as shown in FIG. 18A includes a return envelope portion 2' that has a bottom portion 12 in common use with the envelope 1. The return envelope portion 2' has a return envelope body portion 20' and is provided with two flap portions 18' and 18' for closing and sealing the return envelope body portion 20'.

In this modification, each of the flap portions 18' as does the flap portion 18 in an envelope according to the second form of embodiment of the invention has its area defined with both a line of fold 16', shown by the dash line in FIG. 8A, and a line of cut 17', shown by the alternative long and short dash line in FIG. 8A, which are pre-printed on the front side 20'a of the envelope body portion 10-1. In this modified embodiment, however, two lines of fold 16' and two lines of cut 17' are provided. The lines of fold and cut in one set 16' and 17' and the lines of fold and cut in the other 16' and 17' are formed in two separate areas and oriented longitudinally and transversely of the envelope body portion 10-1, respectively. Correspondingly, the two flap portions 18' and 18', too, are formed in two separate areas. And, as shown in FIG. 18B, on the rear side 10b of the envelope body portion 10-1, an L-shaped line of fold 25A' is printed, and two adhesive portions 30 are formed in two separate sites, respectively.

The envelope 1 shown in FIGS. 18A and 18B may be manufactured essentially in the same manner as previously described. It should be noted here that the abrasive portions 30 are applied to a sheet of paper before the envelope 1 is produced in the form of bag.

This modified form of envelope 1 as well facilitates sealing in the use of its return envelope portion 2' and saves one trouble pasting. And, locating the peelable tab of paper or tab of paper for detachment 31 to lie on the rear side 20b' of the return envelope portion 2', thus of the envelope body portion 10-1 restrains the possibility that the tab 31 may come off to expose the adhesive layer 32 and thus prevents an exposed portion of the adhesive layer from adhering to any other paper or material coming into contact therewith. Optimum conditions of the return envelope portion 2' in reuse of the used envelope 1 are therefore here again assured.

It should be noted that the concept of this modification is applicable to any of the improved envelopes shown and described in connection with FIGS. 1 to 7 as well. Thus, a return envelope portion may be formed to have its body portion including one corner of the bottom portion 12 in common use with the envelope 1.

Further, the same advantages likewise apply where a return envelope portion is formed to have its one or two sides proximate to the bottom portion 12 of the body portion 10-1 in common use with the envelope and to have its area defined with a line of fold and a line of cut printed on the front or rear side of the envelope 1. If only one side of the body portion 10-1 is in common use, then three flap portions will need to be provided in the return envelope body portion. Likewise, three adhesive portions 30 will have to be provided on the return envelope 2 rear side for bonding to these flap portions. These modifications are here again applicable to any of the improved envelope 10 shown in FIGS. 1 to 7 as well.

While in the envelope shown in FIGS. 18A and 18B, the two adhesive portions 30 and 30 are provided on the rear side of the return envelope portion 2' to correspond to the two flap portions 18' and 18', one of these adhesive portions 30 may be dispensed with to form the return envelope portion 2'. Then, one of the flap portions 18' which is not provided with the adhesive portion can be used as a pasting tab to be pasted.

While in the foregoing description of the various embodiments of the invention, mention is made of the return envelope portion 2, 2', 19 that is formed to include or proximate to the bottom portion 12 of the envelope 1, 10, the return envelope portion 2, 2', 19 may alternatively be formed to include or proximate to the top portion of the envelope 1, 10. Then, the address area is designated to cover a lower half of the envelope 1, 10 extending towards its bottom portion 12 and to be entered there.

Also, while in the foregoing description of the embodiments the front side 10a of the envelope 1 is shown to have the front side 20a of the return envelope portion 2, 2', the front side 10a of the envelope 1 may alternatively be formed thereon with the rear side 20b of the return envelope portion 2, 2'. This modification is likewise applicable to the improved envelopes 1 shown and described in connection with FIGS. 1 to 7.

Also, while in the foregoing description, the return envelope portion 2 in the improved envelope shown in FIGS. 1 to 7, 8A and 8B, and 18A and 18B are illustrated to be rectangular and longer transversely and shorter longitudinally of the envelope, it may alternatively be formed to be longer longitudinally and shorter transversely of the envelope.

While in the foregoing description, a line of fold 16, 16', 25A, 25A' and a line of cut 17, 17A, 25 are indicated to be made by printing, they may alternatively be made by embossing or stamping, using a tool such as the rollers 8a and 8b.

Figure 19:
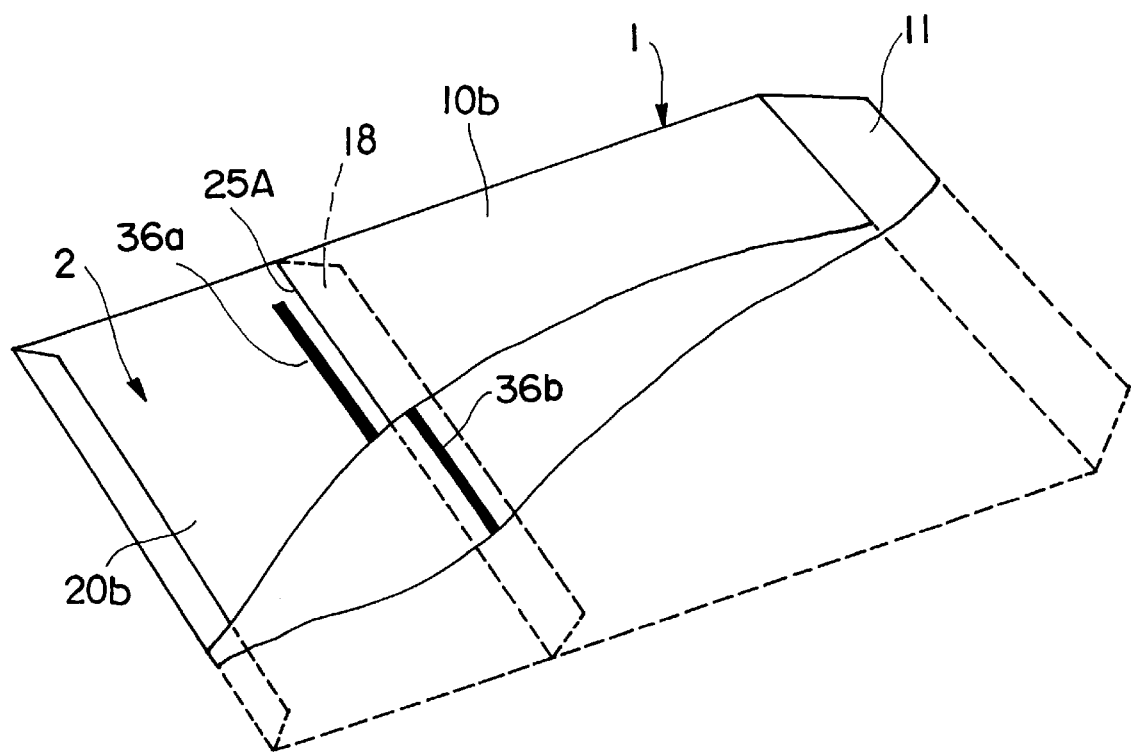
FIG. 19 is a perspective view, in part cut away, diagrammatically illustrating an envelope according to a further form of embodiment of the present invention.

Also, the improved envelope 1 according to the second form of embodiment may have an adhesive portion 30 composed of a pressure sensitive adhesive 36. For instance, in an improved envelope 1 shown in FIG. 19, first a pressure sensitive adhesive 36a is applied to a region of the surface on the rear side 20b of the return envelope body portion 20 with which the rear surface of the flap portion 18 when the latter is folded comes in contact. A second pressure sensitive adhesive 36b is applied to a corresponding region of the rear surface of the flap portion 18 which when the latter is folded comes into contact that region of the sear side 20b where the first pressure sensitive adhesive 36a is applied so that the first and second pressure sensitive adhesives 36a and 36b may then be applied to each other.

In an improved envelope 1 provided with such pressure sensitive adhesives 36a and 36b, folding the flap portion 18 brings the pressure sensitive adhesive 36b thereon into pressure contact with the pressure sensitive adhesive 36a that lies in the area onto which the flap portion 18 is folded. Then, the adhesives 36a and 36b pressure sensitized or activated cause the flap portion 18 to adhere onto that area, thereby sealing the return envelope 2. In this case, the adhesives 36a and 36b are left inactive until the flap portion 18 is folded and may not adhere to any paper it comes in contact with before then. Hence, optimum usability of the return flap portion 2 in the reuse of the used envelope is here again assured.

While in the foregoing description, mention is made of a method of making an improved envelope according to the present invention, various changes and modifications may be made in the method of manufacture described. For example, a continuous sheet of paper unrolled from the supply roller 6a may have adhesive portions applied thereto and the sheet of paper may then be rolled again onto a separate roll. The roll may then be mounted and set on a separate machine in which the continuous sheet of paper with the adhesive portions 30 may be incised to produce a series of envelope 1 units.

The improved envelopes 10 shown and described in connection with FIGS. 1 to 7 may each be manufactured essentially in the same manner as described in connection with the improved envelopes according to the second form of embodiment of the invention.

It may be noted at this point that the return envelope portion 2 in an improved envelope 1 according to the present invention as described may as a matter of course be formed to meet the requirements of a regular size mailing envelope made in Japan.

While the present invention has been described in terms of the presently preferred embodiments thereof, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In an envelope comprising a front and a rear side portion opposing to each other, and having a flap included in the front side portion, and a bottom portion formed of the front and rear side portions and opposing to the flap, an improvement having a return envelope portion, the return envelope portion consisting of:

a flap portion having its area defined with both a line of cut, being a printed line, and a line of fold, said line of fold made by one of printing, stamping and embossing, formed on a region of one of said front and rear side portions, a line of fold, made by one of printing, stamping and embossing, corresponding to the line of fold of said flap portion formed on the side portion opposite to said flap portion, said return envelope portion being defined on the side portion opposite to said flap portion with said line of fold and on one of the front and rear side portions with one of said bottom portion and an upper portion of said return envelope portion opposing to said bottom portion, wherein upon separation of the return envelope portion from the envelope said flap portion is created on one of the front and rear side portions and an excess portion corresponding to said flap potion is created on the opposite side portion which can be folded, at the line of fold formed on the opposite side portion, inside the return envelope portion.

2. An improvement in an envelope having a return envelope portion as set forth in claim 1, in which said return envelope portion is adapted to be detached along said line of cut.

3. An improvement in an envelope having a return envelope portion as set forth in claim 1, in which said return envelope portion is in the form of a customary rectangular envelope with one side that is constituted with said bottom portion.

4. In an envelope comprising a front and a rear side portion opposing to each other, and having a flap included in the front side portion, and a bottom portion formed of the front and rear side portions and opposing to the flap, an improvement having a return envelope portion, the return envelope portion consisting of:

one of a line of cut being a printed line, and a line of fold for defining a flap portion, said line of fold made by one of printing, stamping and embossing, formed on a region of one of said front and rear side portions, a line of fold, made by one of printing, stamping and embossing, corresponding to the line of fold of said flap portion formed on the side portion opposite to said flap portion, said return envelope portion being defined on the side portion opposite to said flap portion with said line of fold and on one of the front and rear side portions with one of said bottom portion and an upper portion of said return envelope portion opposing to said bottom portion, wherein upon separation of the return envelope portion from the envelope said flap portion is created on one of the front and rear side portions and an excess portion corresponding to said flap potion is created on the opposite side portion which can be folded, at the line of fold formed on the opposite side portion, inside the return envelope portion, thus the return envelope portion is constructed without one of said line of cut and said line of fold on one of the front and rear side portions.

5. In an envelope comprising a front and a rear side portion opposing to each other, and having a flap included in the front side portion, and a bottom portion formed of the front and rear side portions and opposing to the flap, an improvement having a return envelope portion, the return envelope portion consisting of:
- a flap portion having its area defined by a pseudo flap portion having a pattern, figure or design printed thereon,
- a line of fold, made by one of printing, stamping and embossing, corresponding to a lower edge of said flap portion formed on the side portion opposite to said flap portion, said return envelope portion being defined on the side portion opposite to said flap portion with said line of fold and on one of the front and rear side portions with one of said bottom portion and an upper portion of said return envelope portion opposing to said bottom portion, wherein upon separation of the return envelope portion from the envelope said flap portion is created on one of the front and rear side portions and an excess portion corresponding to said flap potion is created on the opposite side portion which can be folded, at the line of fold formed on the opposite side portion, inside the return envelope portion.

6. In an envelope having a bag shaped body portion and a flap provided to extend from said body portion, an improvement having a return envelope portion, said return envelope portion being formed in said body portion so that at least one of a bottom portion of said body portion located opposite to said flap and an upper portion in which said flap is provided in said envelope constitutes a corresponding portion of said return envelope portion;

said return envelope portion including a bag shaped return envelope body portion adapted to receive material such as a paper or document, and a flap portion having its area defined with a line of cut, being a printed line, and a line of fold, said line of fold made by one of printing, stamping and embossing;

said return envelope portion being defined on a side portion of the bag shaped body portion, opposite to said flap portion, with a line of fold and on another side portion of the bag shaped body with one of said bottom portion and an upper portion of said return envelope portion opposing to said bottom portion;

said return envelope body portion consisting of:
- a rear surface coming into contact with a rear surface of said flap portion when the latter is folded, one of said rear surfaces having an adhesive applied thereto and a peelable tab of paper applied thereto so as to cover said adhesive on said one surface, said adhesive permitting said flap portion to be bonded to said return envelope body portion upon peeling said peelable tab of paper and folding said flap portion onto said return envelope body portion wherein upon separation of the return envelope portion from the envelope said flap portion is created on one of the side portions and an excess portion corresponding to said flap potion is created on the opposite side portion which can be folded, at the line of fold formed on the opposite side portion, inside the return envelope portion.

7. In an envelope having a bag shaped body portion and a flap provided to extend from said body portion, an improvement having a return envelope portion, said return envelope portion being formed in said body portion so that at least one of a bottom portion of said body portion located opposite to said flap and an upper portion in which said flap is provided in said envelope constitutes a corresponding portion of said return envelope portion;

said return envelope portion including a bag shaped return envelope body portion adapted to receive material such as a paper or document, and a flap portion having its area defined with a line of cut, being a printed line, and a line of fold, said line of fold made by one of printing, stamping and embossing;

said return envelope portion being defined on a side portion of the bag shaped body portion, opposite to said flap portion, with a line of fold and on another side portion of the bag shaped body with one of said bottom portion and an upper portion of said return envelope portion opposing to said bottom portion;

said return envelope body portion consisting of:
- a rear surface coming into contact with a rear surface of said flap portion when the latter is folded, one of said rear surfaces having an adhesive applied thereto and a peelable tab of paper applied thereto so as to cover said adhesive on said one surface,
- said peelable tab of paper covering more than an entire surface of said adhesive thus having side rims not associated with said adhesive and said peelable tab of paper has its side rims separately bonded to said return envelope body portion, and
- said adhesive permitting said flap portion to be bonded to said return envelope body portion upon peeling said peelable tab of paper and folding said flap portion onto said return envelope body portion wherein upon separation of the return envelope portion from the envelope said flap portion is created on one of the side portions and an excess portion corresponding to said flap potion is created on the opposite side portion which can be folded, at the line of fold formed on the opposite side portion, inside the return envelope portion.

8. In an envelope having a body portion in the form of a bag and a flap provided to extend from said body portion, an improvement having a return envelope portion, said return envelope portion being formed in said body portion so that at least one of a bottom portion of said body portion located opposite to said flap and an upper portion in which said flap is provided in said envelope constitutes a corresponding portion of said return envelope portion;

said return envelope portion including a return envelope body portion in the form of a bag adapted to receive a material such as a paper or document, and a flap portion having its area defined with a line of cut, being a printed line, and a line of fold, said line of fold made by one of printing, stamping and embossing;

said return envelope portion being defined on a side portion of the bag shaped body portion, opposite to said flap portion, with a line of fold and on another side portion of the bag shaped body with one of said bottom portion and an upper portion of said return envelope portion opposing to said bottom portion;

said return envelope body portion consisting of:
- a rear surface coming into contact with a rear surface of said flap portion when the latter is folded, said rear surfaces having each pressure sensitive adhesive applied thereto to permit said flap portion to be bonded to said return envelope body portion upon folding said flap portion onto said return envelope body portion and applying a pressure across said folded flap and said return envelope body portion wherein upon separation of the return envelope portion from the envelope said flap portion is created on one of the side portions and an excess portion corresponding to said flap potion is created on the opposite side portion which can be folded, at the line of fold formed on the opposite side portion, inside the return envelope portion.

9. In an envelope having a bag shaped body portion and a flap provided to extend from said body portion, an improvement having a return envelope portion, said return envelope portion being formed in said body portion so that at least one of a bottom portion of said body portion located opposite to said flap and an upper portion in which said flap is provided in said envelope constitutes a corresponding portion of said return envelope portion;

said return envelope portion including a bag shaped return envelope body portion adapted to receive material such as a paper or document;

said return envelope portion consisting of:

one of a line of cut, being a printed line, and a line of fold for defining a flap portion, said line of fold made by one of printing, stamping and embossing, formed on a region of one of said sides of said bag shaped body portion, a line of fold, made by one of printing, stamping and embossing, corresponding to the line of fold of said flap portion formed on the side portion opposite to said flap portion;

said return envelope body portion having a rear surface coming into contact with a rear surface of said flap portion of the return envelope portion when the latter is folded, one of said rear surfaces having an adhesive applied thereto and a peelable tab of paper applied thereto so as to cover said adhesive on said one surface, said adhesive permitting said flap portion to be bonded to said return envelope body portion upon peeling said peelable tab of paper and folding said flap portion onto said return envelope body portion, wherein upon separation of the return envelope portion from the envelope said flap portion is created on one of the side portions and an excess portion corresponding to said flap potion is created on the opposite side portion which can be folded, at the line of fold formed on the opposite side portion, inside the return envelope portion.

* * * * *